NONAQUEOUS LIQUID PESTICIDAL COMPOSITIONS

Bruno Sander and Heinrich Sperber, Ludwigshafen (Rhine), Germany, assignors to Badische Anilin- & Soda-Fabrik Aktiengesellschaft, Ludwigshafen (Rhine), Germany
No Drawing. Filed Jan. 27, 1969, Ser. No. 794,364
Claims priority, application Germany, Feb. 3, 1968, P 17 17 103.8
Int. Cl. A01n 9/28
U.S. Cl. 424—325         4 Claims

ABSTRACT OF THE DISCLOSURE

Nonaqueous liquid formulations for pest control which contain cyclic diethers or triethers and polyhydric alcohols as solvents for the pesticide.

---

The present invention relates to nonaqueous liquid formulations, especially those for pest control, which contain as solvents, in addition to polyhydric alcohols, cyclic diethers or triethers.

It is known to dissolve biologically active ingredients such as those having a fungicidal or insecticidal action in hydrocarbons and to use these solutions for applying these active ingredients in pest control. However, the solutions exhibit the disadvantage that the crude hydrocarbon mixtures used for this purpose give off a strong smell.

It is further known to dissolve biologically active ingredients in liquids miscible with water, such as polyalkylene oxides or adducts of ethylene oxide to long-chain alcohols or phenols. These solutions exhibit the disadvantage of being extremely sensitive to moisture, as a small water content in the solvent reduces the solvent power for the active ingredients to a very considerable degree.

An object of the invention as new and valuable nonaqueous liquid formulations for pest control which contain cyclic diethers and triethers in addition to polyhydric alcohols.

A further object of the invention is a process for controlling pests with the aid of nonaqueous liquid formulations which contain cyclic diethers or triethers in addition to polyhydric alcohols.

These and other objects of the invention are achieved by nonaqueous liquid formulations for pest control, especially for the preservation of wood, which contain polyhydric alcohols, biologically active ingredients and cyclic diethers or triethers.

In principle, the various components of the formulations may be present in any ratio. In practise, a weight ratio of cyclic diethers and triethers to polyhydric alcohols of from 1:5 to 2:1 has been proved to be advantageous. The amount of active ingredients in the mixture may be varied at will; advantageously it lies between 10 and 65% by weight of active ingredient.

By cyclic diethers and triethers we mean heterocyclic compounds which contain 2 or 3 oxygen atoms as the only hetero atoms in the heterocyclic ring. Examples of such compounds are cyclic acetals of diols. Both substituted and unsubstituted cyclic acetals of diols may be used, those acetals containing 5 to 8 ring atoms being particularly important. The following are the most suitable: 1,3-dioxolane, 1,3-dioxane, glycerol-formal, butanediol-1,4-formal, and butanediol-1,4-acetal.

By cyclic diethers and triethers we mean further trioxanes having the general formula

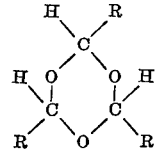

in which R may be hydrogen or a methyl, ethyl, propyl or phenyl group. Examples of such trioxanes are trioxymethylene, paraldehyde, and reaction products of formaldehyde with acetaldehyde.

Further examples of cyclic diethers and triethers are 1,4-dioxanes, i.e. 1,4-dioxane itself and its derivatives containing methyl, ethyl, propyl or phenyl groups.

Mixtures of these cyclic diethers or triethers with each other may of course also be used.

Examples of polyhydric alcohols are ethylene glycol, glycerol, propanediol-1,2, propanediol-1,3, butanediol-1,3, butanediol-1,4, pentanediol-1,5, diethylene glycol and dipropylene glycol.

Of the biologically active ingredients, those active ingredients having an insecticidal or fungicidal action are of special interest. Examples of such ingredients are pentachlorophenol or salts thereof, especially sodium pentachlorophenol, salts of N-nitroso-N-organyl-hydroxylamines, e.g. the calcium salt of N-nitroso-N-cyclohexylhydroxylamine, hexachlorocyclohexane and thiophosphoric esters.

The formulations according to the invention are odorless and insensitive to a small water content. This is a great advantage as any odor of such formulations during application is a considerable nuisance. Technical grade substances having a small water content are usually used for the production of the formulations. This water content is not troublesome in the formulations according to the invention. On the other hand, the preparation of prior art formulations, if they are sensitive to additions of small amounts of water from absolutely dry starting materials causes considerable difficulties in practise.

The formulations according to the invention may be used for all industrial purposes where a nonaqueous solution of biologically active ingredients is to be used. For instance, they are suitable as additives to paints with or without pigment or as additives to impregnating agents, particularly for the preservation of wood, which enable these paints or agents or the materials treated with them to be protected against pests.

The formulations according to the invention may for instance be composed as follows (parts are parts by weight):

Formulation 1:
    50 parts pentachlorophenol
    25 parts 1,3-dioxolane
    25 parts ethylene glycol
Formulation 2:
    50 parts sodium pentachlorophenol
    25 parts 1,3-dioxolane
    25 parts ethylene glycol
Formulation 3:
    5 parts calcium salt of N-nitroso-N-cyclohexylhydroxylamine
    35 parts 1,3-dioxolane
    60 parts ethylene glycol Formulation 4:
- 10 parts calcium salt of N-nitroso-N-cyclohexylhydroxylamine
- 50 parts pentachlorophenol
- 20 parts 1,3-dioxolane
- 20 parts ethylene glycol Formulation 5:
- 5 parts calcium salt of N-nitroso-N-cyclohexylhydroxylamine
- 25 parts sodium pentachlorophenol
- 30 parts 1,3-dioxolane
- 40 parts ethylene glycol Formulation 6:
- 60 parts pentachlorophenol
- 20 parts 1,3-dioxolane
- 20 parts 1,3-butanediol Formulation 7:
- 50 parts pentachlorophenol
- 25 parts 1,3-dioxolane
- 25 parts diethylene glycol Formulation 8:
- 50 parts sodium pentachlorophenol
- 25 parts 1,3-dioxolane
- 25 parts dipropylene glycol Formulation 9:
- 50 parts sodium pentachlorophenol
- 25 parts 1,4-dioxane
- 25 parts ethylene glycol Formulation 10:
- 40 parts sodium pentachlorophenol
- 20 parts trioxane
- 40 parts ethylene glycol Formulation 11:
- 25 parts sodium pentachlorophenol
- 12.5 parts trioxane
- 62.5 parts diethylene glycol Formulation 12:
- 35 parts sodium pentachlorophenol
- 15 parts trioxane
- 50 parts dipropylene glycol Formulation 13:
- 35 parts sodium pentachlorophenol
- 15 parts trioxane
- 50 parts 1,4-butanediol Formulation 14:
- 10 parts calcium salt of N-nitroso-N-cyclohexylhydroxylamine
- 50 parts pentachlorophenol
- 20 parts butanediol-1,4-formal
- 20 parts ethylene glycol The following examples demonstrate the valuable properties of these formulations.

EXAMPLE 1

(a) Commercial nonaqueous liquid formulation for pest control, which contain pentachlorophenol or sodium pentachlorophenol as biologically active ingredients and crude hydrocarbon mixtures (coal tar oils or mineral oil fractions) as solvent, have a strong, extremely offensive odor.

(b) In contrast, the above-mentioned formulations 1 to 14 have a hardly noticeable smell or are substantially odorless.

EXAMPLE 2

(a) Water is slowly added, while stirring thoroughly, to a mixture of 58 parts (by weight) of ethylene glycol, 36 parts of 1,3-dioxolane and 6 parts of the calcium salt of N-nitroso-N-cyclohexylhydroxylamine.

Only after 76 of water has been added does the calcium salt (fungicide) precipitate.

(b) Water is again slowly added, while stirring thoroughly, to a mixture of 58 parts of ethylene glycol, 36 parts of an ethenoxylation product from alkyl-substituted phenols or resin acids and 6 parts of the calcium salt of N-nitroso-N-cyclohexylhydroxylamine.

The calcium salt already precipitates after an addition of only 3 parts of water.

EXAMPLE 3

A calcium salt of N-nitroso-N-cyclohexylhydroxylamine, containing 3.1% by weight of water in the form of residual moisture, is used for the preparation of a fungicide formulation.

(a) 6 parts of ethylene glycol, 3 parts of 1,3-dioxolane and 1 part of the calcium salt of N-nitroso-N-cyclohexylhydroxylamine fungicide are homogeneously mixed. A clear solution is obtained.

(b) 6 parts of ethylene glycol, 3 parts of an oxyethylation product from alkyl-substitute diphenols or resin acids and 1 part of the calcium salt of N-nitroso-N-cyclohexylhydroxylamine do not give a homogeneous mixture. The calcium salt remains to a large extent undissolved.

We claim:

1. A non-aqueous liquid composition for pest control consisting essentially of:
   (a) a polyhydric alcohol selected from the group consisting of ethylene glycol, glycerol, propanediol-1,2, propanediol-1,3, butanediol-1,3, butanediol-1,4, pentanediol-1,5, diethylene glycol and dipropylene glycol;
   (b) a cyclic ether selected from the group consisting of 1,3-dioxolane, 1,3-dioxane, glycerol-formal, butanediol-1,4-formal, butanediol-1,4-acetal, 1,4-dioxane, 1,4-dioxane substituted with methyl, ethyl, propyl or phenyl compounds of the formula

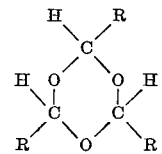

in which R is hydrogen, methyl, ethyl, propyl or phenyl and mixtures of said cyclic ethers; and
   (c) 10–65% by weight of a pesticide selected from the group consisting of pentachlorophenol, the sodium salt thereof, the calcium salt of N-nitroso-N-cyclohexylhydroxylamine and hexachlorocyclohexane, the weight ratio of (b) to (a) being 1:5 to 2:1.

2. A composition as claimed in claim 1 wherein said pesticide is pentachlorophenol.

3. A composition as claimed in claim 1 wherein said pesticide is sodium pentachlorophenol.

4. A composition as claimed in claim 1 wherein said pesticide is the calcium salt of N-nitroso-N-cyclohexylhydroxylamine.

References Cited

UNITED STATES PATENTS 917,706  4/1909  Blackmore _____ 424—278
3,223,513  12/1965  Geary _____ 424—278

OTHER REFERENCES

Chemical Abstracts, vol. 60, 13140(f), (1964).

ALBERT T. MEYERS, Primary Examiner
N. A. DREZIN, Assistant Examiner

U.S. Cl. X.R.
424—278, 347, 358